(12) United States Patent
Lacy

(10) Patent No.: US 6,223,402 B1
(45) Date of Patent: May 1, 2001

(54) CLIP AND CASING TEST TELEPHONE INCORPORATING CLIP

(75) Inventor: Graham Keith Lacy, London (GB)

(73) Assignee: Chesilvale Electronics Limited (GB)

( * ) Notice: Subject to any disclaimer, the term of this patent is extended or adjusted under 35 U.S.C. 154(b) by 0 days.

(21) Appl. No.: 09/404,999

(22) Filed: Sep. 27, 1999

(51) Int. Cl.$^7$ .................................................. A44B 21/00
(52) U.S. Cl. ...................... 24/599.4; 24/601.1; 24/3.12; 379/433
(58) Field of Search ................................ 24/599.4, 599.6, 24/661.1, 3.12, 343, 600.4, 600.5, 600.7; 379/433, 428, 446, 454; D14/147

(56) References Cited

U.S. PATENT DOCUMENTS

| | | | |
|---|---|---|---|
| 281,657 | * 7/1883 | Flagg | 24/599.4 |
| D. 376,145 | * 12/1996 | Hathorn et al. | D14/147 |
| D. 418,132 | * 12/1999 | Zoiss et al. | D14/147 |
| 688,615 | * 12/1901 | Feidler | 24/599.6 |
| 1,744,344 | * 1/1930 | Sullivan | 24/599.4 |
| 3,792,205 | * 2/1974 | O'Dea | 379/433 X |
| 5,513,259 | * 4/1996 | Pettit | 379/433 X |

* cited by examiner

Primary Examiner—Robert J. Sandy
(74) Attorney, Agent, or Firm—Larson & Taylor, PLC

(57) ABSTRACT

A clip for a test telephone has a hook part and a gate part which pivots to open and close the mouth of the hook part. In the open position it enters a slot in the hook part. The hook part has an offset coupling portion for pivotable connection to the gate part and to the telephone casing. The casing has a channel in which the clip is mounted so as to be pivotable to a use configuration in which the mouth of the hook part is aligned with the adjacent surface of the casing so an object to be hooked can slide relative to the casing and into the clip.

16 Claims, 3 Drawing Sheets

U.S. Patent    May 1, 2001    Sheet 1 of 3    US 6,223,402 B1
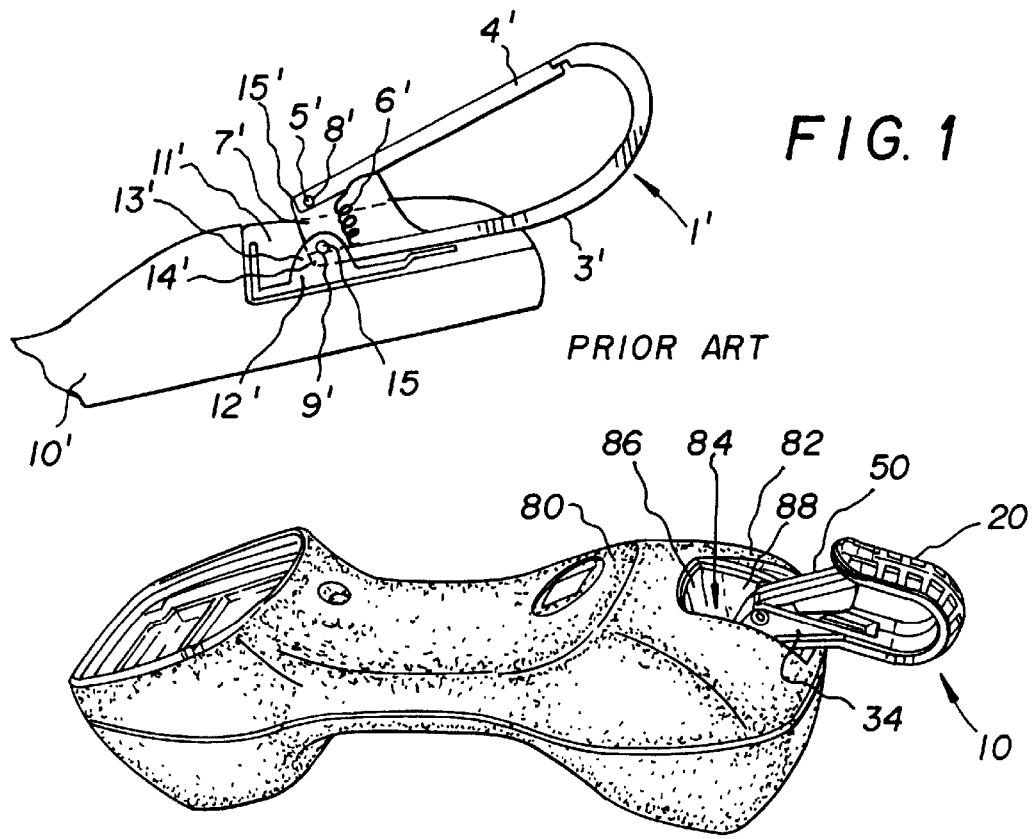
FIG. 1  PRIOR ART
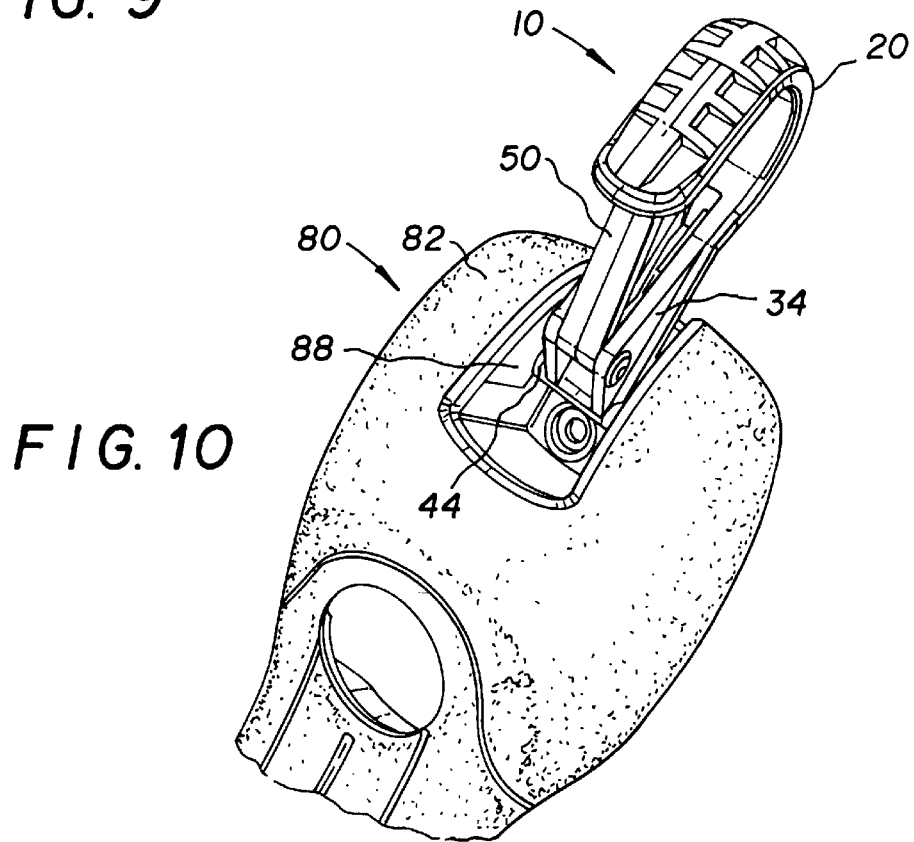
FIG. 9
FIG. 10

CLIP AND CASING TEST TELEPHONE INCORPORATING CLIP

BACKGROUND OF THE INVENTION

The present invention relates to clips and to casings, particularly casings for test telephones. A test telephone is an example of an article which must be releasably connectable to objects, for example to the belt of a telephone engineer, to a mounting structure affixed to a telegraph pole, or to a telephone cable. The clips according to the invention are particularly suitable for quick and reversible connection to the chosen mounting.

As shown schematically in FIG. 1, a known type of clip 1', includes a closed loop of stainless steel, the loop including a hook 3' and a gate 4' and being openable by moving the gate from a closed position to an open position relative to the hook. A first end of the gate is pivotally connected to the shank of the hook by a rivet 5'. The second end of the gate is free but in the closed position it contacts the end of the hook distal to the shank so as to close the loop.

The gate is biassed into the closed position by a coil spring 6' which extends between the shank and a terminal portion of the gate adjacent its first end. The shank of the hook includes a central body of rectangular cross-section and a pair of parallel plates. The plates 7 are integral with the body and project from the same inwardly directed face thereof to provide a housing for the coil spring and for the terminal portion of the gate. Each plate has two an apertures 8', 9', corresponding apertures in the two plates being in register with one another. A first pair 8' accommodates the rivet 5' connecting the gate to the hook.

As shown in FIG. 1, the clip 1' is mounted to a casing 10' of a telephone. The casing 10' has a channel 11' containing a mounting shackle 12'. This has a spaced pair of upstanding flanges 13' with aligned apertures 14 '. A rivet 15' extends through these apertures and the second pair of apertures 9' of the clip, for pivotably mounting the clip.

This known type of clip assembly suffers from the disadvantage that in the open position, the gate lies against the shank of the hook. Accordingly, it hinders the movement of an object into the "mouth" of the hook when the object is being connected to the clip. This difficulty is particularly accentuated when the user tries to attach the clip to relatively large objects. Such movement is further hindered by the way the clip is mounted to the casing. The plates 7' have an exposed rear corner region 15' which will tend to snag an object over which the clip is sliding. Furthermore they project in a direction which narrows the mouth of the hook.

For the telephone engineer this difficulty may be especially important. The engineer may be working at a considerable height up a telegraph pole and therefore will need a quick and simple way of attaching an item, such as a telephone, to a mounting structure on the pole. The longer that the object is unattached to its intended mount, the greater the risk that it will fall.

The present invention aims to provide an improved type of clip, casing and test telephone which ameliorates the above disadvantage: the clip is suitable for quick and easy connection of an item, eg. a telephone, to a mounting structure.

SUMMARY OF THE INVENTION

Accordingly, in a first aspect the present invention provides a clip including a loop having a hook part and a gate part pivotally connected thereto, the loop being openable by pivoting the gate part relative to the hook part from a closed position to an open position against a spring bias, wherein the hook part of the loop includes a recess which accommodates at least a substantial portion of the gate part of the loop in the open position. Desirably, the loop is made of plastic.

The hook part may include a shank to which a first end of the gate part is pivotally connected, a concavity within the shank providing at least part of the recess within which the gate, or a substantial portion of it, is accommodated in the open position. The shank may be adapted for pivotal connection of the gate, for example through the provision of one or more brackets projecting from the shank. Each of the brackets may have an aperture, the two apertures being in register with on another so as to provide a pair of mounting sockets for accommodating a rivet which passes through the first end of the gate. The hook may have strengthening formations on its outer surface; one or more ribs may for example project from an outwardly directed surface of the hook, the ribs providing additional structural support to the hook.

A second end of the gate opposite to the first end is free, but in the closed position the second end reversibly engages with a portion of the hook distal to the shank. The second end of the gate may engage with the distal portion of the hook adjacent, but not at, a free end of this distal portion. Accordingly, the distal portion of the hook may include a terminal lip. Where present, the lip is preferably turned outwardly to thereby provide an inner guide surface which slopes towards the gate. This inner surface is therefore suitable for directing an object to be attached to the loop onto the gate.

In preferred embodiments of the present invention, the first part of the loop may include first interacting means and the second part may include second interacting means. The first and second interacting means cooperate with one another to guide the second part of the loop towards and into the recess in the first part of the loop as the loop is opened. The first interacting means may be provided within the recess itself. Desirably, a hole may be provided in a wall of the recess which receives and accommodates a guide member which projects from the second part of the loop. The hole may for example be a slot and the second part of the loop may be provided with a planar guide vane.

The second part of the loop may be biassed into its closed position by a coil spring, but other mechanical equivalents such as leaf spring may alternatively be used.

The first part of the loop may include attachment means for securing the clip to an item, for example to a telephone. The attachment means may include one or more sockets each of which may accommodate a mounting prong attached to the item.

In a second aspect the invention provides a clip having a hook part and a gate part, wherein the hook part is generally U-shaped having a mouth defined between outer and inner limbs connected by an arcuate portion, said outer limb having a free end remote from said arcuate portion, said inner limb having a main limb portion and a connection portion remote from said arcuate portion to which said gate part is pivotally connected, said connection portion being in line with and/or offset from said main limb portion so as not to obstruct said mouth. Preferably said inner limb defines a recess for accommodating at least a substantial portion of the gate part in its open configuration when it is pivoted away from said outer limb.

In a third aspect the invention provides a casing incorporating a clip according to the first or second aspect of the invention, the casing having an exterior surface portion, the clip being mounted so that it has a use configuration in which the mouth of the loop is aligned with said casing exterior surface so that a hookable object can slide over said casing exterior surface and pass smoothly into said loop. Preferably the casing exterior surface is shaped to define a channel, open at one end, closed at the opposite end by an upstanding wall portion, and having opposed side walls, and the clip is mounted within said channel and projects through said open end in said use configuration. Preferably said clip is pivotably mounted and is pivotable to a configuration in which the gate part abuts said upstanding wall portion or a vertex where said upstanding wall portion meets said casing exterior surface, further pivoting urging said gate part to pivot to open the mouth of the loop. Preferably said clip and casing have mutually engaging pivot formations comprising pivot shafts on one of said clip and casing and which are pivotably received in apertures provided by the other one of said clip and casing. Preferably the pivot shafts are frictionally engaged within said apertures.

An embodiment of the present invention will now be described by way of example only and with reference to the accompanying drawings.

BRIEF DESCRIPTION OF THE DRAWINGS

FIG. 1 is a schematic view, in longitudinal section, of part of a prior art test telephone with clip;

FIG. 9 is a perspective view of a test telephone casing embodying the invention, incorporating a clip as shown in FIGS. 2–8; and FIG. 10 is a larger-scale view of part of the casing showing the clip and its attachment.

DESCRIPTION OF THE PREFERRED EMBODIMENT

Figure 2:
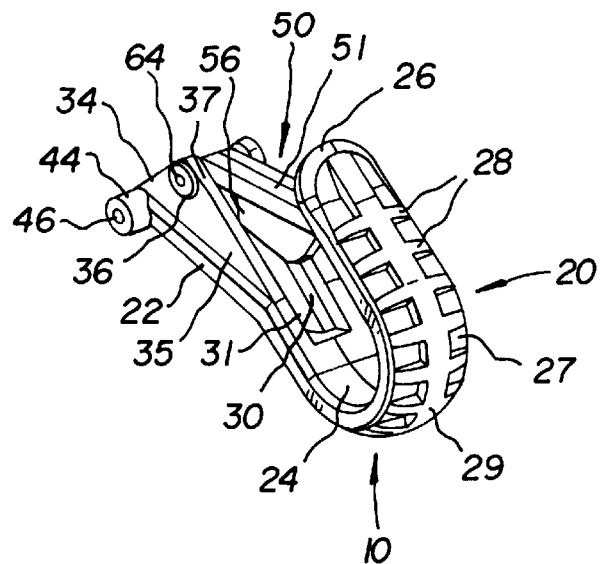
FIG. 2 is a perspective view of a clip embodying the present invention having a hook and a gate, the gate being shown in the closed position.

With reference to FIGS. 2 to 6, the clip 10 includes a hook 20 and a gate 50, each made from plastic. The gate 50 is pivotally connected at one end to the hook 20 such that it is movable between a closed position and an open position. In the closed position a free end 55 of the body 51 of the gate 50 contacts an inner surface 25 of the C-shaped portion 24 of the hook 20. The clip 10 thus forms a closed loop, in which the hook 20 provides a first part of the loop and the gate 50 provides a second part of the loop. The gate 50 is biassed into the closed position by a coil spring (shown in schematic form in FIG. 3) and is moved into the open position against the bias. In the open position the gate 50 is accommodated within a recess 30, thereby enabling an object to be inserted into the open loop with little or no obstruction from the gate 50.

The hook 20 includes a shank 22 connected an angle to the end of one limb of a U-shaped portion 24. At the end of the other limb of the U-shaped portion 24 there is an outwardly turned lip 26. The U-shaped portion has an inner surface 25 and an outer surface 27. Projecting from the outer surface 27 there is a longitudinal rib 29 and a number of transverse ribs 28. The ribs 28, 29 are integral with and provide strength to the U-shaped portion 24.

A pair of triangular brackets 34 are integral with and project from the shank 22 of the hook 20, the leading face 37 of each bracket 34 being continuous with the inner surface 25 of the U-shaped portion 24. A thin boss 36 having a bore 38 projects from an outwardly directed surface 35 of each bracket 34. The bore 38 continues through the bracket 34 from which the boss 36 projects. In combination, the bores 38 receive a mounting pin 64. The mounting pin 64 is used to connect pivotally the gate 50 to the hook 20, as is described below.

The gate 50 includes a body 51. Extending from and integral with the body 51 is a plate 56 and a cylindrical projection 58. The function of each of these components will be described below. At end 53 of the body 51 there is a cylindrical sleeve 52 which has a bore 54 for accommodating a mounting pin 64. A skirt 60 depends tangentially from the sleeve 52.

The gate 50 is pivotally connected to the hook 20 using the mounting pin 64. The pin 64 is accommodated in the bore 54 of the sleeve 52 and extend into the bores 38 in the brackets 34 and bosses 36.

It will be observed that the space 33 between the brackets 34 is continuous with a substantially rectangular hollow 31 in the U-shaped portion 24, the leading face 37 of the bracket 34 being continuous with the inner face 25 of the U-shaped portion 24 (as described above). In combination, the space 33 between the brackets 34 and the hollow 31 provide a recess 30 for accommodating the gate 50 in its open position, the recess 30 being of sufficient depth to receive the body 51 of the gate 50. Accordingly, when the gate 50 is in its open position, an object may be moved past the gate into the "mouth" of the U-shaped portion 24 without being obstructed by the gate.

A narrow slot 32 is provided at the base of the recess 30. Part of this aperture 32 is provided in the shank 22 of the hook 20, while the remainder is in the U-shaped portion 24. The slot 32 cooperates with the plate 56 in the gate 50 to guide the gate 50 into the recess 30 as it is moved from its closed to its open position.

A rectangular surround 33 extending around the slot 32 projects from outwardly facing surfaces 23 and 27 of the shank 22 and U-shaped portion 24. The surround 33 provides structural support to the hook 20 around the slot 32. The longitudinal rib 29, extending along the outer surface of the U-shaped portion 24, is continuous with the surround 33, which is of similar height. On the other side of the surround 33, the longitudinal rib 29 continues along the outer surface 23 of the shank 22 until it reaches a transverse cylindrical moulding at the free end of the shank 22. The moulding projects at either side to provide pivot shafts. Each shaft 44 has an outwardly open cylindrical cavity 46.

Figure 3:
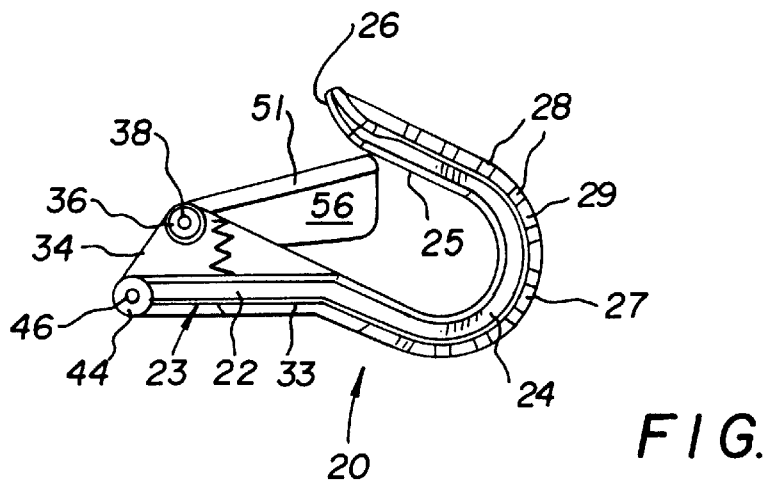
FIG. 3 is a side view of the clip of FIG. 2.
Figure 4:
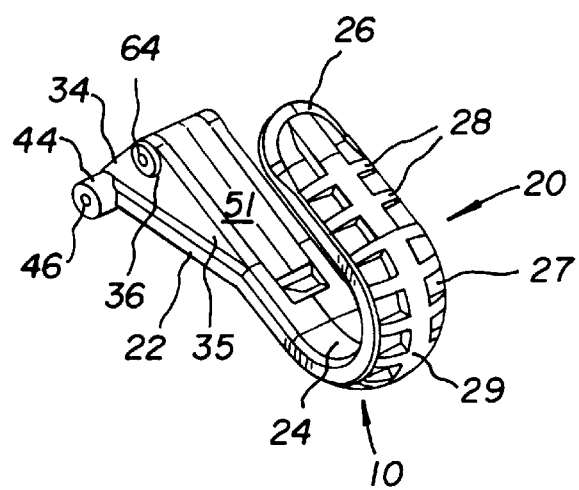
FIG. 4 is a perspective view of the clip of FIG. 2 with the gate in the open position.
Figure 6:
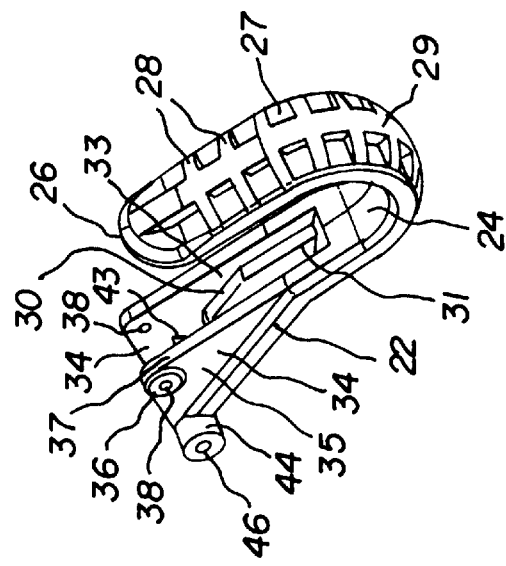
FIG. 6 is a perspective view of the hook of the clip of FIG. 1.
Figure 8:
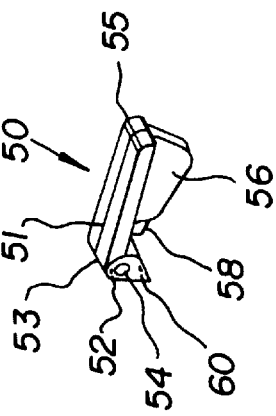
FIG. 8 is a perspective view of the gate of the clip of FIG. 2.
Figure 5:
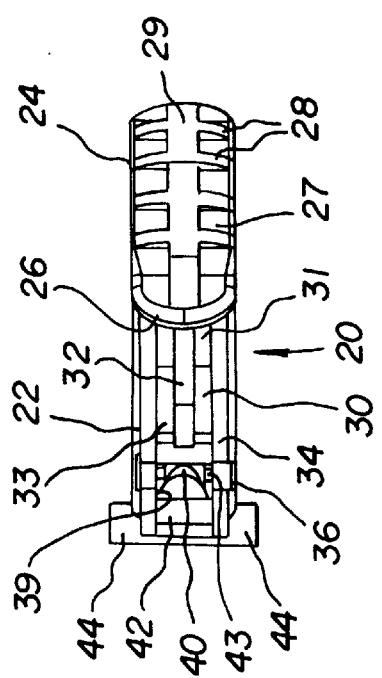
FIG. 5 is a plan view of the hook of the clip of FIG. 2.
Figure 7:
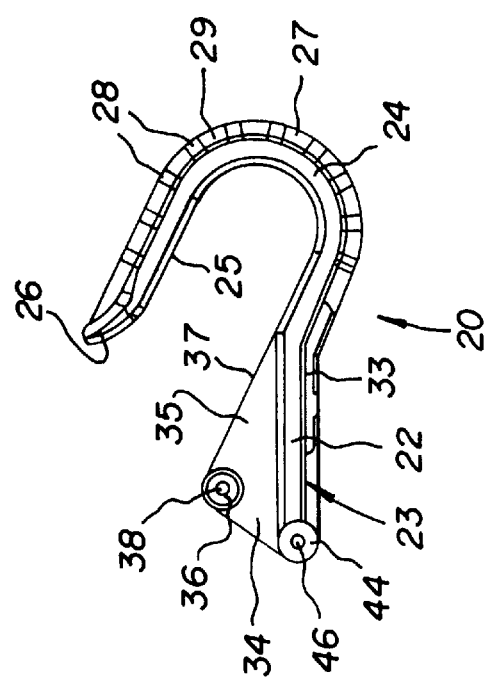
FIG. 7 is a side view of the hook of the clip of FIG. 2.

The gate 50 is biassed into its closed position by a coil spring (shown in schematic form in FIG. 3). One end of the coil spring is held on the cylindrical projection 58 of the gate 50. The other end of the spring is trapped between an arcuate flange 40 and a wedge 42. The flange 40 and wedge 42 are integral with the shank 22 of the hook 20 and project into the space 33 between the brackets 34. From an inwardly directed surface 39 of each bracket 34, projects a stop 43. In the closed position the end 55 of the gate 50 contacts the inner surface of the U-shaped portion 24 of the hook 20 and the skirt 60 in the gate contacts the stops 43.

FIGS. 9 and 10 show the clip 10 mounted to a casing part 80 of a test telephone. The casing part has a smoothly convex exterior surface portion 82 interrupted by a channel 84 which is open at one end corresponding to the upper end of the telephone. The other end of the channel 84 terminates in an upstanding wall 86. The channel has a pair of spaced side walls 88. These have aligned apertures in which the pivot shafts 44 are pivotably but frictionally received. Thus the clip can be pivoted, but does not move under its own weight. FIGS. 9 and 10 show the clip pivoted fully clockwise. The mouth of the hook 20 is open in a direction aligned with the adjacent exterior surface portion 82 of the casing part 80. Thus an object to which the assembly is to be clipped can slide relative to the surface portion 82 and smoothly pass into the clip, without change of direction and without meet any resistance except from the gate portion 51 which is urged to pivot into its recess so that it does not obstruct the mouth of the hook.

If the clip is pivoted anticlockwise, the gate portion 51 eventually contacts the upstanding wall 86 to urge the opening of the gate. This can be used from one-handed release of the assembly from a structure to which it is hooked.

Whereas the invention has been described and illustrated with reference to the preferred embodiment, the skilled reader will appreciate that many variations and modifications are possible within the spirit and scope of the invention. It is intended to include all such variations and modifications within the scope of the appended claims.

What is claimed is:

1. A casing comprising a casing part and a clip comprising a hook part defining a mouth, the casing part having an exterior surface portion, wherein the clip includes a gate part which is pivotally connected to the hook part so as to be pivotable between a closed configuration in which it obstructs the mouth of said hook part and an open configuration in which the mouth is unobstructed; and wherein the hook part includes a recess which accommodates the gate part in its open configuration; the clip being mounted to the casing part so that it has a use configuration in which the mouth of the hook part is aligned with said casing exterior surface portion so that the hookable object can slide over said casing exterior surface portion and pass smoothly into said hook part without being obstructed by the gate part.

2. A casing according to claim 1 wherein there is defined said exterior surface portion a channel, open at one end, closed at the opposite end by an upstanding wall portion, and having opposed side walls, and the clip is mounted within said channel and projects through said open end in said use configuration.

3. A casing according to claim 2 wherein said clip is pivotable to a configuration in which the gate part abuts said upstanding wall portion or a vertex where said upstanding wall portion meets said casing exterior surface portion, further pivoting urging said gate part to pivot to open the mouth of the hook.

4. A casing according to claim 1 wherein said clip and casing portion have mutually engaging pivot formations comprising pivot shafts on one of said clip and casing portion and which are pivotably received in apertures provided by the other one of said clip and casing portion.

5. A casing according to claim 4 wherein the pivot shafts a frictionally engaged within said apertures.

6. A casing according to claim 1 wherein said clip also includes a gate part, and wherein the hook part is generally U-shaped having a mouth defined between outer and inner limbs connected by an arcuate portion, said outer limb having a free end remote from said arcuate portion, said inner limb having a main limb portion and a connection portion remote from said arcuate portion to which said gate part is pivotally connected, said connection portion being in line with or offset from said main limb portion so as not to obstruct said mouth.

7. A casing according to claim 6 wherein at least part of said connection portion is offset from said main limb portion and includes a connection formation by which the clip is connected to the rest of the casing.

8. A casing comprising a casing part and a clip comprising a hook part defining a mouth, the casing part having an exterior surface portion, the clip being mounted to the casing part so that it has a use configuration in which the mouth of the hook part is aligned with said casing exterior surface portion so that a hookable object can slide over said casing exterior surface portion and pass smoothly into said hook part; wherein said clip and casing portion have mutually engaging pivot formations comprising pivot shafts on one of said clip and casing part and which are pivotably received and frictionally engaged in apertures provided by the other one of said clip and casing part.

9. A casing according to claim 8 wherein the clip includes a gate part which is pivotally connected to the hook part so as to be pivotable between a close configuration in which it obstructs the mouth of said hook part and an open configuration in which the mouth is relatively unobstructed.

10. A casing according to claim 8 wherein the hook part is generally U-shaped having a mouth defined between outer and inner limbs connected by an arcuate portion, said outer limb having a free end remote from said arcuate portion, said inner limb having a main limb portion and a connection portion remote from said arcuate portion to which said gate part is pivotally connected, said connection portion being in line with or offset from said main limb portion so as not to obstruct said mouth.

11. A casing comprising a casing part and a clip comprising a hook part defining a mouth, the casing part having an exterior surface portion in which is defined a channel, open at one end, closed at the opposite end by an upstanding wall portion, and having opposed side walls; the clip being mounted to the casing part within said channel so that it has a use configuration in which the clip projects through said open end of the channel, and the mouth of the hook part is aligned with said casing exterior surface portion so that a hookable object can slide over said casing exterior surface portion and pass smoothly into said hook part; and wherein the clip includes a gate part which is pivotally connected to the hook part so as to be pivotable between a closed configuration in which it obstructs the mouth of said hook part and an open configuration in which the mouth is relatively unobstructed, and wherein said clip is pivotable to a configuration in which the gate part abuts said upstanding wall portion or a vertex where said upstanding wall portion meets said casing exterior surface portion, further pivoting urging said gate part to pivot to open the mouth of the hook.

12. A casing according to claim 11 wherein the hook part includes a recess which accommodates the gate part in the open configuration.

13. A casing according to claim 11 wherein said clip and casing portion have mutually engaging pivot formations comprising pivot shafts on one of said clip and casing portion and which are pivotably received in apertures provided by the other one of said clip and casing portion.

14. A casing according to claim 13 wherein the pivot shafts a frictionally engaged within said apertures.

15. A casing comprising a casing part and a clip comprising a hook part defining a mouth, the casing part having an exterior surface portion; wherein said clip also includes a gate part, and wherein the hook part is generally U-shaped having a mouth defined between outer and inner limbs connected by an arcuate portion, said outer limb having a free end remote from said arcuate portion, said inner limb having a main limb portion and a connection portion remote from said arcuate portion to which said gate part is pivotally connected, said connection portion being in line with or offset from said main limb portion so as not to obstruct said mouth; the clip being mounted to the casing part at is connection portion so that it has a use configuration in which the mouth of the hook part is aligned with said casing exterior surface portion so that a hookable object can slide over said casing exterior surface portion and pass smoothly into said hook part.

16. A casing according to claim 15 wherein at least part of said connection portion is offset from said main limb portion and includes a connection formation by which the clip is connected to the rest of the casing.

* * * * *